J. M. TOWLE.
DISTRIBUTER HEAD.
APPLICATION FILED MAR. 17, 1920.

1,394,051.

Patented Oct. 18, 1921.
5 SHEETS—SHEET 1.

Inventor
James M. Towle
by Roberts, Roberts & Cushman
his Attorneys

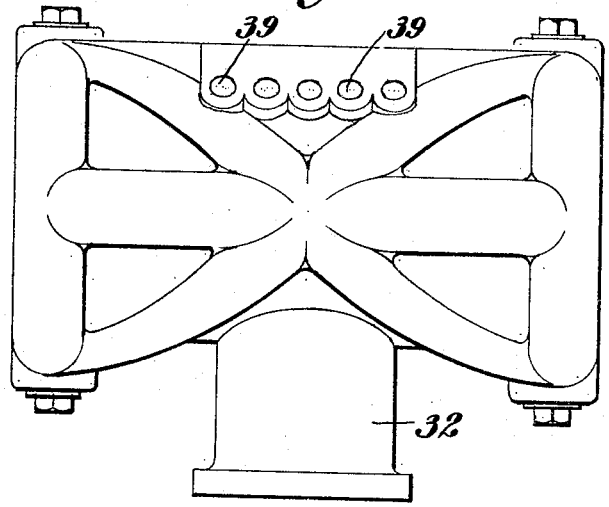
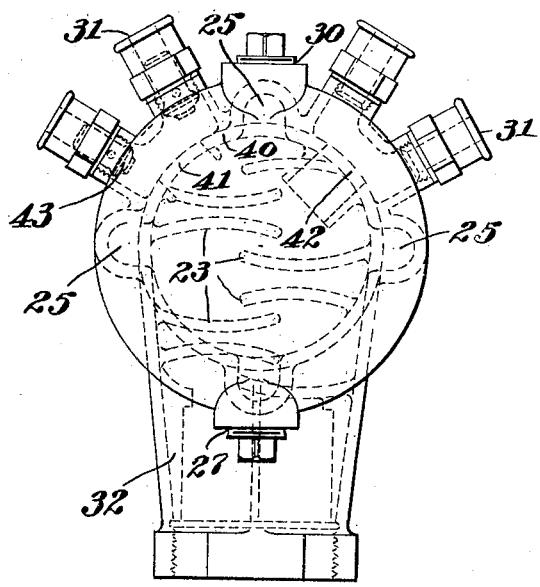

J. M. TOWLE.
DISTRIBUTER HEAD.
APPLICATION FILED MAR. 17, 1920.

1,394,051.

Patented Oct. 18, 1921.

Inventor
James M. Towle
by Roberts Roberts & Cushman
his Attorneys

J. M. TOWLE.
DISTRIBUTER HEAD.
APPLICATION FILED MAR. 17, 1920.
1,394,051.
Patented Oct. 18, 1921.
7 SHEETS—SHEET 5.
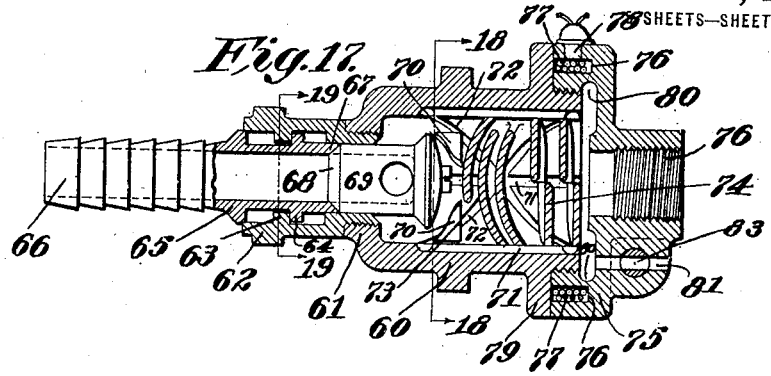
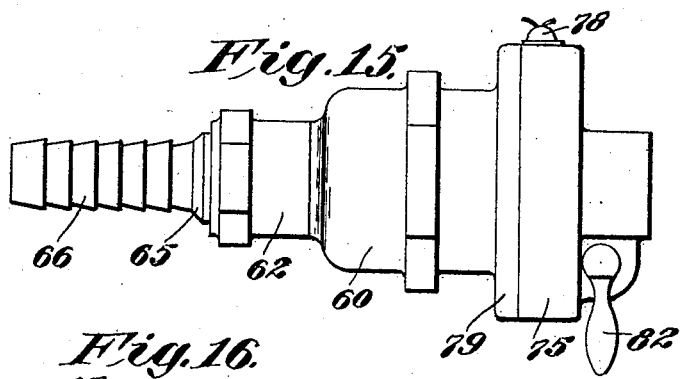
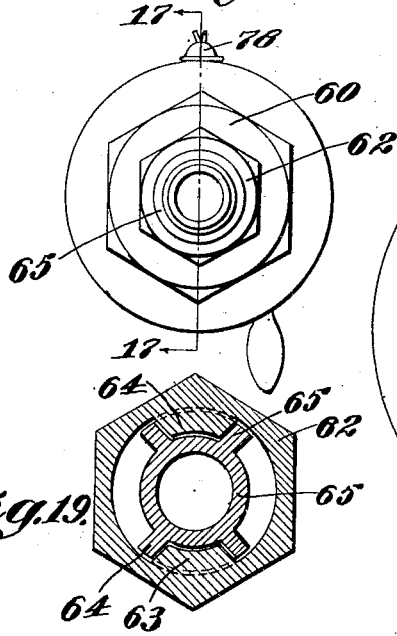
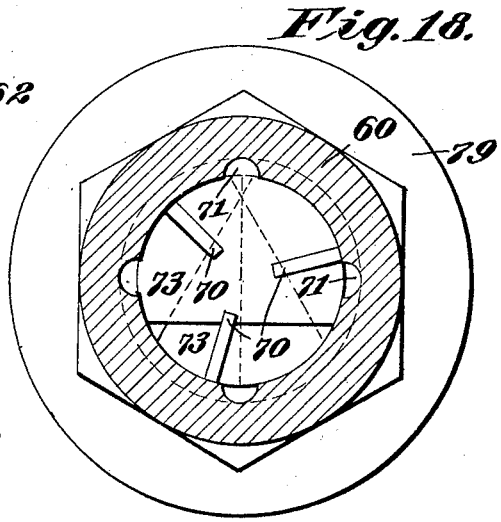
Inventor
James M. Towle
by Roberts Roberts & Cushman
his Attorneys

UNITED STATES PATENT OFFICE.

JAMES M. TOWLE, OF WEST SOMERVILLE, MASSACHUSETTS, ASSIGNOR OF ONE-HALF TO LOUIS I. BECKWITH, OF BOSTON, MASSACHUSETTS.

DISTRIBUTER-HEAD.

1,394,051. Specification of Letters Patent. Patented Oct. 18, 1921.

Application filed March 17, 1920. Serial No. 366,593.

*To all whom it may concern:*

Be it known that I, JAMES M. TOWLE, a citizen of the United States of America, and resident of West Somerville, in the county of Middlesex and State of Massachusetts, have invented new and useful Improvements in Distributer-Heads, of which the following is a specification.

This invention consists of a new and improved distributer head for compressed air, steam, or other gas distribution systems, my improved distributer head including means for eliminating water or other liquids from the element being distributed and thus distributing the gas in dry form.

In the use of air and steam lines considerable difficulty is experienced due to condensation of the water vapor in the air or condensation of a portion of the steam. This may be due to various causes such as changes in pressure or in temperature. The water is the cause of considerable difficulty in such lines as it may clog elbows, narrow pipes or valves and also in cold weather may freeze, closing the passage and even bursting pipes or tool connections.

In using air or steam in ship or building construction or in general shop practice it is often convenient to have a distributer head at the end of a fixed steam or air main and to attach to this head hose or pipe extensions in varying numbers and lengths as the work may require. Often such distributer heads are unprotected from the weather and subject to freezing conditions.

It is highly desirable that all water be eliminated from the steam or vapor at such distributer head in order that it may not get into the smaller distribution heads and clog them or the tools being operated. It is also desirable to provide means for preventing the collected water from freezing in the distributer head. In the case of steam distribution systems this collected water is at a temperature very little less than boiling and it is desirable, therefore, instead of blowing this water out and losing its power, to heat it and reconvert it into steam.

It is an object of my invention to provide a combined distributer head and water separator. It is an object to provide in connection with such separator, efficient means for collecting and for eliminating the collected water. It is also an object to provide means for the prevention of the freezing of such water and, in the case of steam lines, for its reconversion into steam. It is an additional object to provide such a device which will function either when attached to an upwardly extending main end or when attached to a main end opening downwardly. It is a further object to provide a head adapted to carry valves in its head openings and having means to prevent the valves from leaving their ways upon fall of pressure in the head.

I have illustrated several preferred embodiments of my invention in the attached drawings in which—

Fig. 6 is similar to Fig. 1, but shows a somewhat modified form;

Fig. 7 is an end elevation of a form of the device slightly different from that shown in Fig. 1;

Fig. 15 is a side view of another form of the device;

Fig. 16 is a view of Fig. 15 as seen from the left end;

Fig. 17 is a section taken on line 17—17 of Fig. 16;

Fig. 18 is a section on a somewhat enlarged scale taken on line 18—18 of Fig. 17; and Fig. 19 is a section taken on line 19—19 of Fig. 17.

Figure 1:
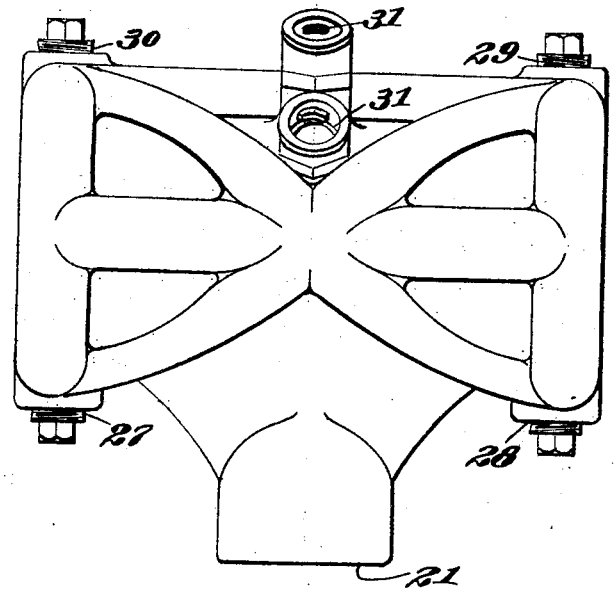
Figure 1 is a side elevation of one form of my device.

The form of the device shown in Figs. 1 to 4 consists of an integral casting having the opening 21 adapted to be attached to an air, steam or similar main. Extending across the opening are the baffle plates 22 and on the main body of the head are the similar plates 23. These plates extend downwardly from right to left and may be laterally curved as indicated in dash lines in Fig. 7. Circumferential channels 24 are formed inside the ends of the head, longitudinal channels 25 on the sides and top and oblique crossed channels 26 on the sides. These channels serve to receive and collect all water condensed either on the inner sides of the device or on the baffle plates. A plurality of openings 27, 28, 29 and 30 are formed in the head, for the purpose of drawing off any condensation. As shown in the drawing these openings are screw threaded and closed by suitable plugs.

Figure 2:
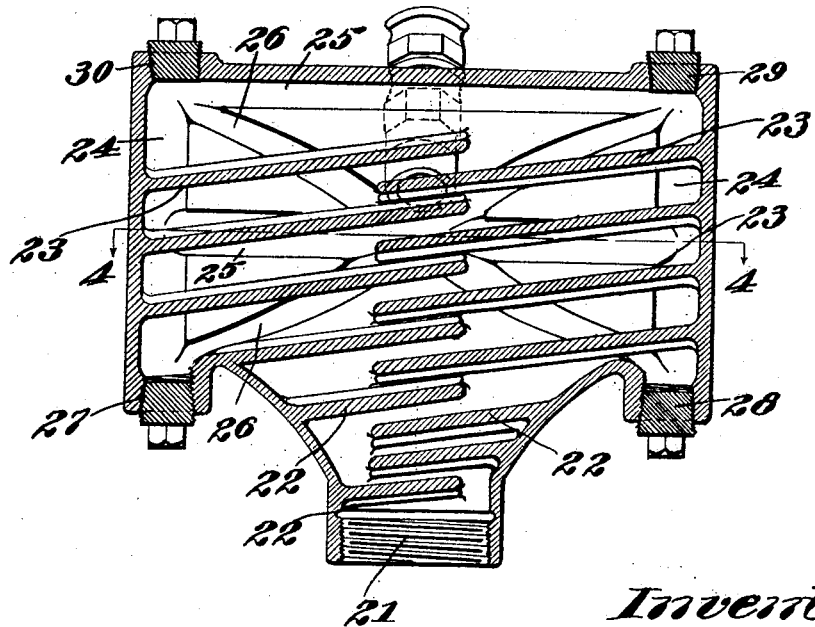
Fig. 2 is a vertical section of Fig. 1.
Figure 3:
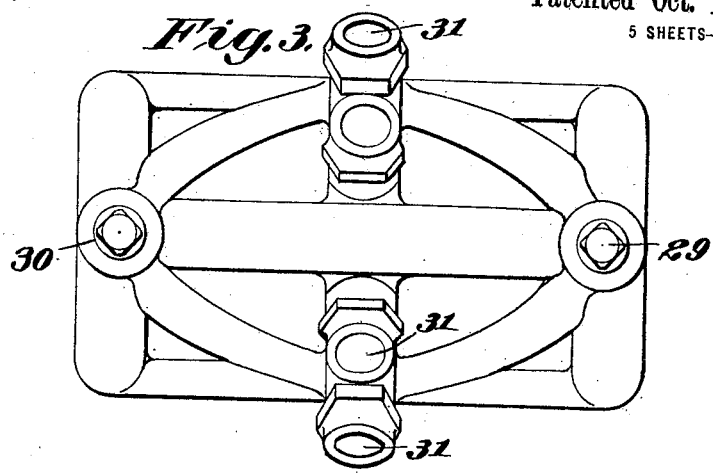
Fig. 3 is a top view of Fig. 1.
Figure 4:
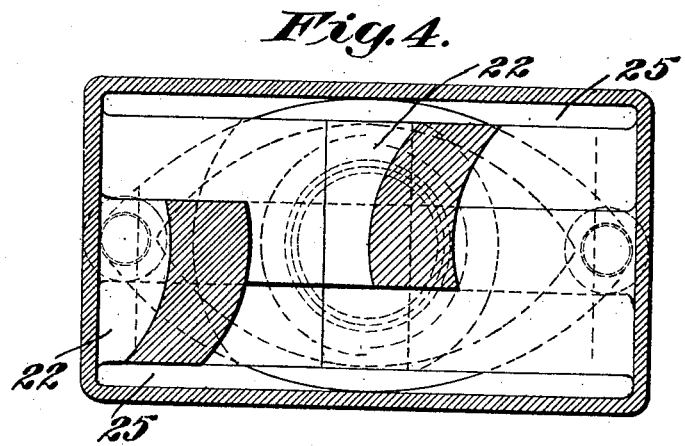
Fig. 4 is a horizontal cross section of Fig. 2 taken on the line 4—4.

When the device is in the position shown in Fig. 2, obviously the greater part of the water condensed will gather adjacent the opening 27, though some will gather at the opening 28. If the head is inverted the most of the water will gather adjacent the opening 29 with some adjacent the opening 30. These openings or any of them may be connected to a drainage system or may simply be opened from time to time when the pressure in the head will blow out the water collected.

A plurality of openings 31 are provided for the attachment of hose or pipe leads to tools or machines.

Figure 5:
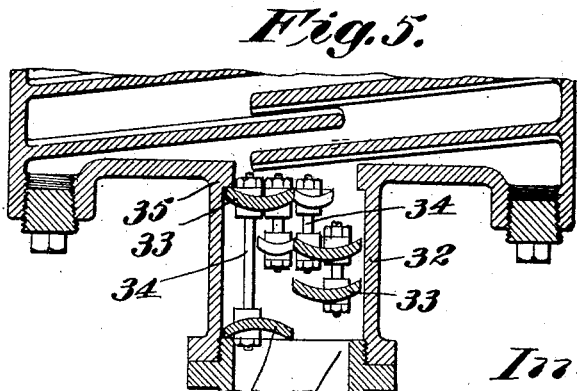
Fig. 5 is a partly broken away section of a modified form of the device.
Figure 13:
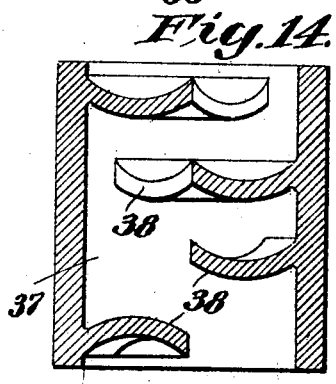
Fig. 13 is a plan view of a removable separator member.
Figure 14:
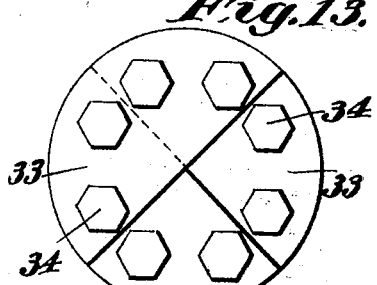
Fig. 14 is a vertical section of a different form of removable separator member.

Figs. 5 and 6 show a generally similar head, which has, however, a different contour and construction in the lower part thereof. In Fig. 5, the lower part 32 is shown in cross section and is cylindrical in form. Instead of the integral baffle plates 22 as shown in Fig. 2, the present figure shows a series of semi-circular plates 33 held together by the bolts 34. This device may be removed from the tube 32, being held therein simply by bearing against the fixed flange 35 and the removable flange 36. This composite baffle plate is shown in plan view in Fig. 13. Instead of the composite baffle device shown in Figs. 5 and 13, a solid casting such as is shown in Fig. 14 may be used, the casting comprising a tubular collar 37 and the integral baffle plates 38. This device will be retained in place in the manner shown in Fig. 5.

In Fig. 6, instead of having the openings 31 in a transverse row, two longitudinal rows of openings 39 are provided one such row on each side of the upper part of the head.

Fig. 7 shows an end view of a form of the device which is in general similar to that shown in Figs. 1 to 4 with the exception that the lower portion is formed as shown in Fig. 5 and that an additional partition 40 is provided adjacent the openings 31. This partition is pierced by the passages 41 and 42 through which the steam or air will pass in reaching the openings 31. This partition 40 aids in preventing water reaching the openings 31, particularly when the head is used in an inverted position, and has an additional function in that it prevents the valve members 43 from dropping entirely out of the openings 31. This form of valve is shown more in detail in Fig. 17 but is covered by my application Serial No. 347,079, filed December 24, 1919, and need not be further described at this point.

Figure 8:
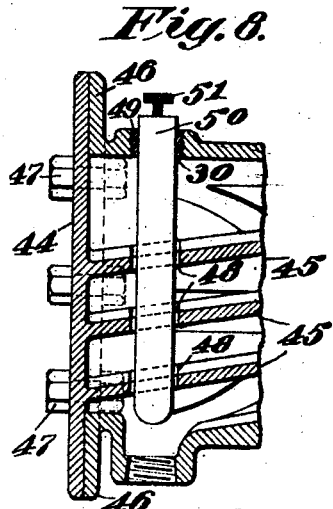
Fig. 8 is a broken away vertical section similar to Fig. 2, but showing a modified construction, adapted to receive a heating element.

In Fig. 8 I have shown a portion of a head of the type shown in Fig. 2 but constructed in a different manner. Instead of being formed as an integral casting, here each end 44 with its attached baffle plates 45 is formed as a separate casting and is fastened to flanges 46 of the main casting by bolts 47. As shown the plates 45 have openings 48 therein to permit the insertion of the electric heating member 50. This member 50 is provided with a collar 49 which fits into the opening 30 and also with a binding post 51 for the purpose of connecting it to a source of electric power.

Figure 9:
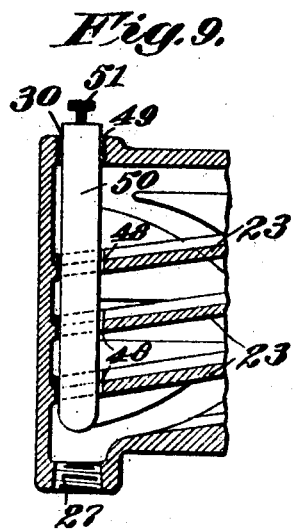
Fig. 9 is a view similar to Fig. 8, but of a modified form of the device.
Figure 10:
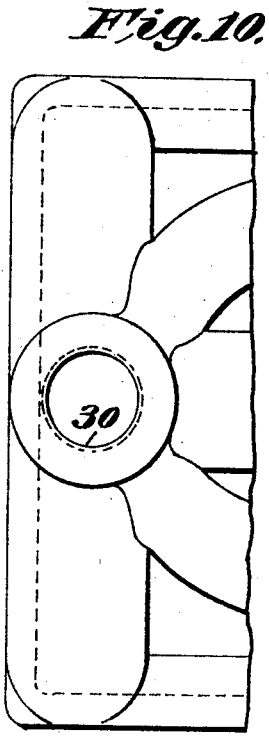
Fig. 10 is a plan view of Fig. 9, on a somewhat larger scale.

Fig. 9 shows a heating element 50 installed in a head which is identical with that shown in Fig. 2, with the exception of the holes 48 in the plates 23. Fig. 10, shows the portion of the head as shown in Fig. 9, as seen from above.

Figure 11:
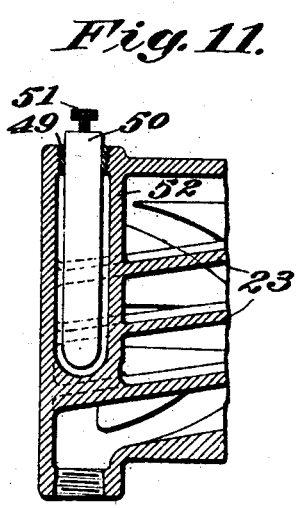
Fig. 11 is a view similar to Fig. 8, but of a further modified form of the device.
Figure 12:
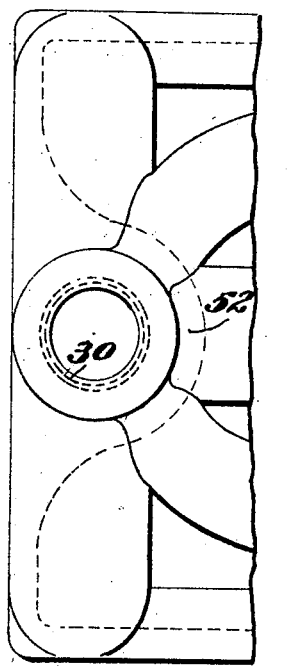
Fig. 12 is a plan view of Fig. 11 on a somewhat larger scale.

In Figs. 11 and 12 the structure is modified by the addition of an additional partition 52. This partition serves to keep the electric member out of contact with the steam or air, which may be desirable in some cases for the prevention of corrosion.

Figs. 15 to 19 show a modified form of the device. This device consists of the body member 60, having a reduced end 61 into which is fitted a receiving member 62. This member 62 has interior lugs 63 which interfit the lugs 64 of a connector member 65. The outer end 66 of the member 65 is adapted to be connected with a hose line and the inner end 67 is beveled to fit an oppositely beveled end 68 of the tubular valve member 69. The lugs 70 prevent the valve member from dropping out of position when there is no pressure against it. This valve is similar to that indicated in Fig. 7 and as has been stated is more specifically described and claimed in a copending application.

On the inside surface of the member 60 are the longitudinal grooves 71 and the crossed spiral grooves 72. Inside the member are the two series of baffle plates 73 and 74, which as shown, are integral with the member 60. In the member 75 is the circumferential groove 80 into which the grooves 71 and 72 drain, and from the groove 80 is the blow out or drain lead 81 which may be closed or opened by the movement of the handle 82 of the faucet 83.

It is obvious that although this form of the device is shown with but a single lead, a Y or other known type of branch lead may be used therewith.

While I have shown my device in a number of forms all of them accomplish the same purpose in that they provide a head containing means for efficiently separating water from steam, gas or air and having means for eliminating this water after it is collected. It may be eliminated by being drawn off, or blown out, or by reconversion into steam.

The form of the device shown in Figs. 15 to 19 is particularly adapted to eliminate the water by reconverting it to steam although this may be accomplished by other forms of the device. As shown in Fig. 17 the heating element completely surrounds the collecting groove and the device has been found in practice to deliver dry steam without the necessity for the removal of any heated water with its consequent power loss.

I claim:

1. In a device of the class described, a separator head having a plurality of baffle plates therein, grooves formed on the inner face of the head adapted to receive liquid condensed on said baffle plates and on the inner walls of the head, and adapted to lead the liquid to either of diagonally opposite portions of the head, and means to eliminate the said condensed liquid.

2. In a device of the class described, a separator head having a plurality of baffle plates therein, grooves formed on the inner face of the head adapted to receive and collect liquid condensed in said head and to lead the liquid to either of two ports for the elimination of the collected liquid.

3. In a device of the class described, a separator head having a plurality of baffle plates therein, longitudinal diagonal and transverse grooves formed on the inner face of the head adapted to receive and collect liquid condensed on said head and means for the elimination of the collected liquid.

4. In a device of the class described, a separator head and an inlet throat, of a diameter substantially less than that of the head, overlapping baffle plates located in said head and in said throat adapted to collect liquid from the gas passing through the head, the baffle plates in the throat being removable.

5. In a device of the class described, a separator head and an inlet throat, baffle plates located in said head and in said throat adapted to collect liquid from the gas passing through the head, the baffle plates in the throat comprising a unitary removable structure.

6. In a device of the class described a separator head having a plurality of baffle plates therein, the said plates being formed in two oppositely extending overlapping, laterally staggered series, all of said plates being inclined in substantially the same direction.

7. In a device of the class described a separator head having a plurality of baffle plates therein, the said plates being formed in two oppositely extending overlapping, laterally staggered series, the plates of each series being attached to one end of the separator head.

8. In a device of the class described a separator head having a plurality of baffle plates therein, the said plates being formed in two oppositely extending overlapping, laterally staggered series, the plates of each series being attached to one end of the separator head, the ends being removable.

9. In a device of the class described a separator head and an inlet throat, baffle plates located on the head disposed in two oppositely extending overlapping, laterally staggered series, and overlapping staggered plates located in the inlet throat, all said plates adapted to collect liquid from the gas passing through.

10. In a device of the class described, a separator head and an inlet throat, baffle plates located in the head disposed in two overlapping staggered series, the plates of each series being attached to one end of the separator head, the ends being removable, and overlapping staggered plates located in the inlet throat, said plates comprising a unitary removable structure, all said plates adapted to collect liquid from the gas passing through.

11. A separator head having an outlet port adapted to receive a check valve, and means located in said head adjacent the inner side of said port adapted to prevent a check valve from leaving the port upon drop of pressure in the head.

12. A separator head having an outlet port adapted to receive a check valve, and stop lugs located in said head adjacent the inner side of said port adapted to prevent a check valve from leaving the port upon drop of pressure on the head.

13. In a device of the class described, a separator head having baffle plates therein adapted to separate liquid from gas passing through a cavity adapted to receive said liquid, and heating means, surrounding said cavity, adapted to reconvert the separated liquid into gas.

Signed by me at Boston, Massachusetts, this fifteenth day of March, 1920.

JAMES M. TOWLE.